May 10, 1938.  J. GARAMI  2,117,059

CONVERTIBLE AUTOMOBILE BODY

Filed June 4, 1936  2 Sheets-Sheet 1

Joseph Garami
INVENTOR
BY Victor J. Evans & Co.
ATTORNEYS

May 10, 1938.  J. GARAMI  2,117,059
CONVERTIBLE AUTOMOBILE BODY
Filed June 4, 1936  2 Sheets-Sheet 2
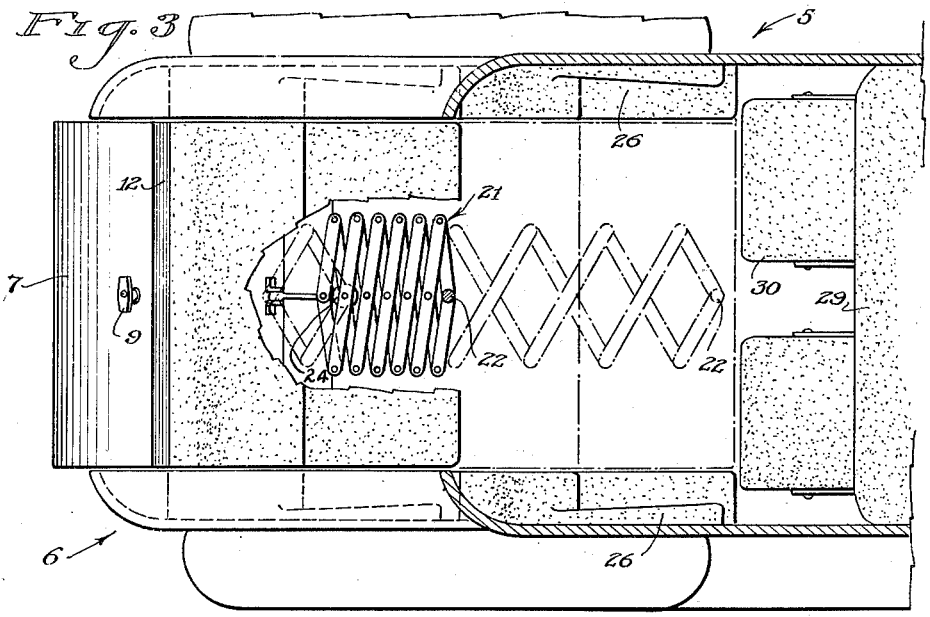
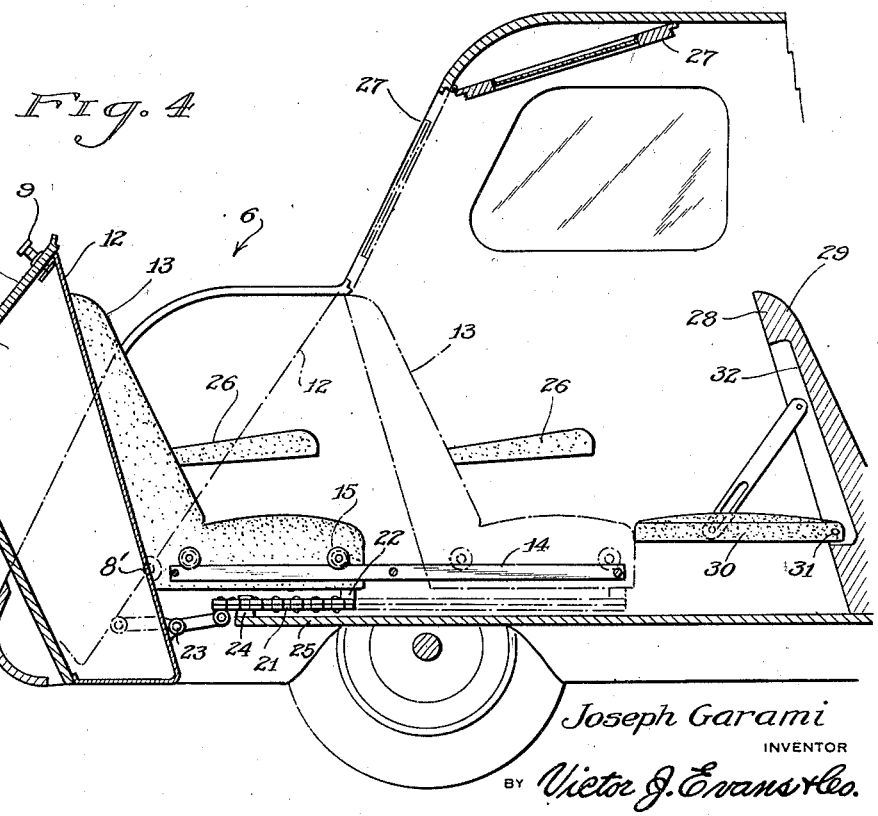
Joseph Garami
INVENTOR
BY Victor J. Evans & Co.
ATTORNEYS Patented May 10, 1938

2,117,059

UNITED STATES PATENT OFFICE 2,117,059

CONVERTIBLE AUTOMOBILE BODY

Joseph Garami, New York, N. Y.

Application June 4, 1936, Serial No. 83,586

4 Claims. (Cl. 296—63)

The present invention relates to an improvement in automobile bodies, and more particularly to a convertible seat construction therefor.

The primary object of the invention is the provision of means for converting the usual rear seat of the sedan type of automobile for use as a rumble seat.

A further object of the invention is the construction and arrangement whereby the rear portion of an automobile body may be used for transporting luggage, and at the same time adapt its use as a rumble seat.

A still further object of the invention is the provision of a leverage mechanism associated with the rear seat of an automobile of the sedan type, which mechanism is adapted to adjust the seat, and at the same time open the rear compartment of the automobile.

The invention will be fully and comprehensively understood from a consideration of the following detailed description when read in connection with the accompanying drawings which form part of the application.

In the drawings:

Fig. 3 is a longitudinal sectional view thru the body of an automobile with parts broken away to illustrate the leverage mechanism for supporting the seat, and Fig. 4 is a vertical sectional view illustrating the invention in use.

Figure 1:
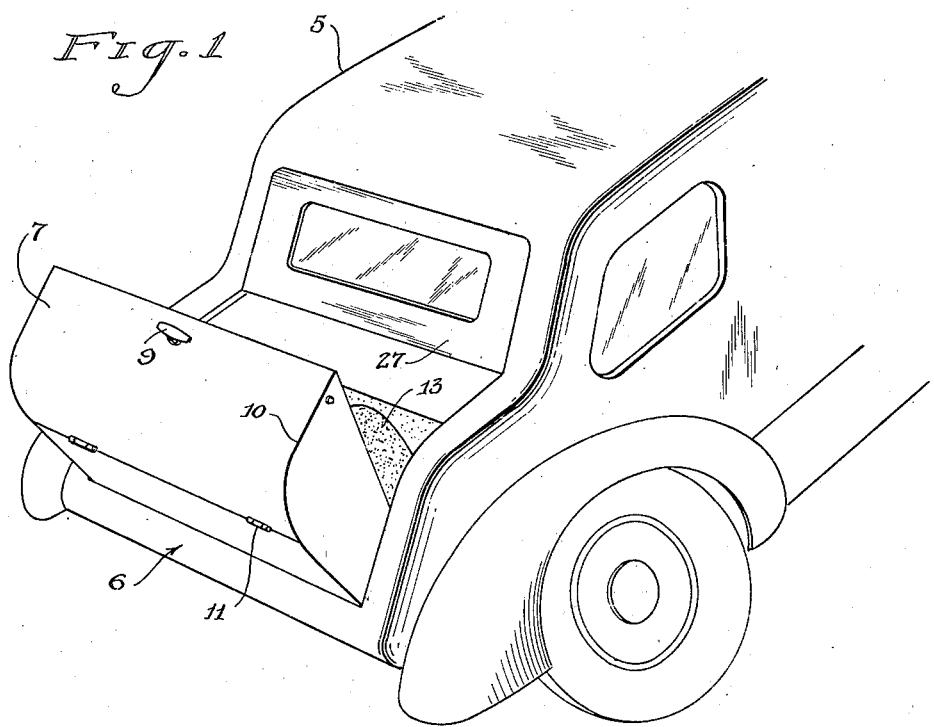
Fig. 1 is a partial perspective view of an automobile embodying the new and improved construction.

Referring to the drawings for a more detailed description thereof, the numeral 5 indicates generally an automobile body embodying the invention hereinafter described. The invention is primarily devised for use with an automobile of the closed sedan type wherein the rear portion normally supporting the luggage carrying trunk has been modified to receive the rear seat of the automobile, said rear seat being adapted to be moved by means of a suitable mechanism to be hereinafter described.

In order to adapt an automobile body for use with the invention, the rear portion 6 has been modified to include a hinged compartment 7 having an interior 8 adapted to receive luggage and the like, the entire compartment 7 being swingably mounted on the rear portion 6, preferably by the laterally projecting trunnions 8' journalled therein. Access to the interior 8 is obtained by means of a handle 9, said handle serving to release the door 10, which is hinged at 11. The inner wall 12 of the compartment 8 provides a supporting surface for the back of the seat 13, which as illustrated in Fig. 4 of the drawings in full lines, has been moved from the position indicated in dot and dash lines. When the rear portion 7 is in closed position as illustrated in dot and dash lines in Fig. 4 of the drawings, the inner surface 12 of the compartment 8 serves as a wall to completely enclose the interior of the automobile.

Figure 2:
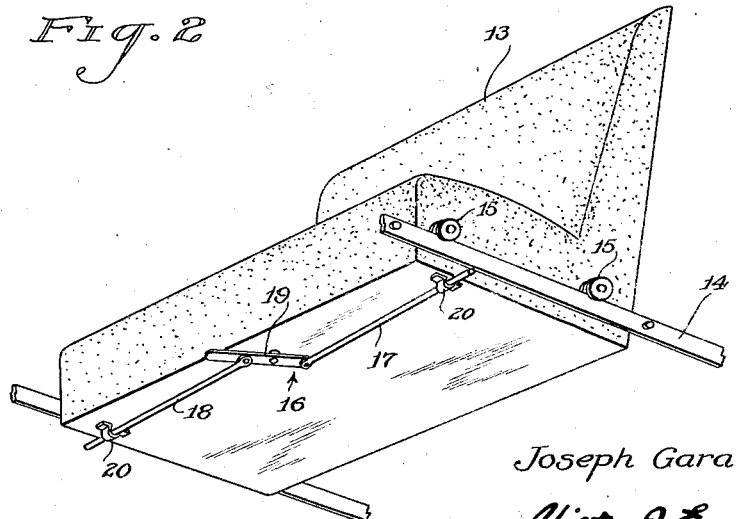
Fig. 2 is a perspective view of the rear seat of an automobile and removed from the same and illustrating the locking and releasing means.

As afore indicated, the primary purpose of the invention is to provide a construction whereby the usual rear seat of a sedan type of automobile may be converted for use as a rumble seat. In Fig. 4 of the drawings, the seat 13 is illustrated in dot and dash lines in its normal position and in full lines in its converted position. The seat 13 is mounted for movement on a trackway 14 by means of rollers 15 carried by said seat, and movable on the trackway. The trackway 14 may be attached in any desired manner to the body of the vehicle, but the rollers 15 are preferably journalled to the outer portion of the seat cushion. For locking the seat 13 in its normal position there is provided the means indicated by the numeral 16 in Fig. 2 of the drawings. The means 16 includes a pair of levers 17 and 18 pivotally connected to an operating lever 19, which lever is journalled in the base of the seat 13. The levers 17 and 18 are supported in suitable guideways 20 supported at each end of the seat and the free ends of said levers engaged in a corresponding recess not shown, provided in the body of the automobile adjacent the seat. For releasing the seat 13 for movement on the trackway 15, the handle 19 is actuated to retract the levers 17 and 18 from their recesses.

The mechanism for simultaneously actuating the seat 13 and hinged compartment 7 will now be described, during which time attention is directed to Figs. 3 and 4 of the drawings. The lazy tong leverage mechanism 21 has one end thereof fixedly secured to the seat at 22, and the other end attached at 23 to the wall 12 of the compartment 8. An intermediate pivotal connection is provided at 24, said connection forming part of the chassis 25 of the vehicle. In Fig. 3 of the drawings the leverage 21 is shown in full lines with the seat 13 in use as a rumble seat, and in dot and dash lines when said seat is in its normal position. When the locking means 16 is released pressure may be exerted on the seat 13 to urge the same rearwardly and thru the action of the lazy tong 21 being connected directly to the seat and to the wall of the compartment 12, said compartment will be raised at a speed corresponding to the travel of the seat. Another means of operating the actuating mechanism would be to release the seat locking means and move the rear compartment upwardly, during which time the seat will be urged rearwardly thru means of the lazy tong leverage 21.

Corresponding end portions 26 are provided in the rumble seat portion of the vehicle and also in the body thereof. It is, of course, to be understood that said end portions remain stationary while the seat 13 is removable.

A hinged flap portion 27 may also be provided so as to enable occupants in the rumble seat to carry on conversation with occupants within the vehicle. A suitable mechanism may be provided for attaching the flap 27 to the interior of the car when in open position and likewise when in closed position.

To further increase the seating capacity of the interior of the car, the rear portion 28 of the front seat 29 embodies a seat 30 pivotally connected at 31, and foldable so as to be received within the recess 32. The seat 30 will normally be used when the seat 13 has been converted into a rumble seat.

From the above description it will be readily apparent that there is provided an arrangement whereby the usual rear seat of the sedan type of an automobile may be readily converted for use as a rumble seat. The change can be accomplished in a minimum amount of time, and requires slight modification and a minimum number of parts for adapting its use.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. In a convertible vehicle body including a passenger compartment and a projecting portion extending rearwardly therefrom, an outwardly swingable cover on said projecting portion, a seat including a fixed back slidably mounted on said body and normally positioned in said passenger compartment and adapted to be positioned within said projecting portion to provide a rumble seat therein, and means associated with said seat and cover and operative in a horizontal plane below said seat whereby to swing said cover to closed or open position by sliding movement of said seat.

2. In a convertible vehicle body including a passenger compartment and a projecting portion extending rearwardly therefrom, an outwardly swingable cover on said projecting portion, a seat including a fixed back slidably mounted on said body and normally positioned in said passenger compartment and adapted to be positioned within said projecting portion to provide a rumble seat therein, and means associated with said seat and cover and operative in a horizontal plane below said seat whereby to shift said seat to either forward or retracted position, said means being actuated by swinging said cover.

3. In a convertible vehicle body including a passenger compartment and a projecting portion extending rearwardly therefrom, an outwardly swingable cover on said projecting portion, a seat including a fixed back slidably mounted on said body and normally positioned in said passenger compartment and adapted to be positioned within said projecting portion to provide a rumble seat therein, and means operative in a horizontal plane for actuating said cover and said seat in unison, said means comprising a series of cooperating levers associated respectively with said seat and said cover and fulcrumed on said body.

4. In a convertible vehicle body including a passenger compartment and a projecting portion extending rearwardly therefrom, an outwardly swingable cover on said projecting portion, a seat including a fixed back slidably mounted on said body and normally positioned in said passenger compartment and adapted to be positioned within said projecting portion to provide a rumble seat therein, and means operative in a horizontal plane for actuating said cover and said seat in unison, said means comprising a series of cooperating levers moving in a horizontal plane and presenting a lazy tongs having the respective ends thereof operably connected with said seat and said cover and being intermediately fulcrumed on said body.

JOSEPH GARAMI.